United States Patent
Ito

(10) Patent No.: US 8,741,493 B2
(45) Date of Patent: Jun. 3, 2014

(54) FUEL PRODUCTION SYSTEM

(75) Inventor: Yasushi Ito, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 13/810,092

(22) PCT Filed: Dec. 24, 2010

(86) PCT No.: PCT/JP2010/073402
§ 371 (c)(1),
(2), (4) Date: Jan. 14, 2013

(87) PCT Pub. No.: WO2012/086071
PCT Pub. Date: Jun. 28, 2012

(65) Prior Publication Data
US 2013/0257061 A1    Oct. 3, 2013

(51) Int. Cl.
*C25B 1/00* (2006.01)
*C25B 15/02* (2006.01)

(52) U.S. Cl.
CPC ............... *C25B 15/02* (2013.01)
USPC ................ 429/411; 204/229; 290/1 R

(58) Field of Classification Search
CPC .................................. C25B 5/02
USPC .................................... 429/411
See application file for complete search history.

(56) References Cited

U.S. PATENT DOCUMENTS

| 4,161,657 | A   | * | 7/1979 | Shaffer, Jr. .............. 290/1 R |
| 5,795,666 | A   | * | 8/1998 | Johnssen ................. 429/411 |
| 7,537,683 | B2  | * | 5/2009 | Prerad .................... 205/628 |
| 7,781,112 | B2  | * | 8/2010 | Sridhar et al. ........... 429/418 |
| 2002/0025457 | A1 | * | 2/2002 | Dodd et al. ................ 429/9 |
| 2003/0141200 | A1 | * | 7/2003 | Harada .................. 205/637 |
| 2008/0127646 | A1 | * | 6/2008 | Doland .................. 60/641.2 |

FOREIGN PATENT DOCUMENTS

| DE | 102012103458 A1 | * | 10/2013 |
| JP | A-09-085044 |   | 3/1997 |
| JP | A-2004-120903 |   | 4/2004 |
| JP | A-2008-533287 |   | 8/2008 |
| JP | A-2009-506213 |   | 2/2009 |
| JP | 2010062192 A | * | 3/2010 |
| WO | WO 2006/099573 A1 | | 9/2006 |
| WO | WO 2007/025280 A2 | | 3/2007 |

* cited by examiner

*Primary Examiner* — Joseph Waks
(74) *Attorney, Agent, or Firm* — Oliff PLC

(57) ABSTRACT

A fuel production system and has an object to provide a fuel production system that is capable of producing HC with high efficiency by using variable energy. A first device is a $CO/H_2$ generating device that simultaneously generates CO and $H_2$ by performing electrolysis on $CO_2$ and water. A second device is a $H_2$ generating device that generates $H_2$ by performing electrolysis on water. When electric power derived from natural energy is used, the first device is seriously affected by its variation. Therefore, a steady-state portion of generated electric power (straight line in a figure) is supplied to the first device while the remaining variable portion (the portion above the straight line) is supplied to the second device.

12 Claims, 12 Drawing Sheets

10 POWER GENERATING DEVICE
14 SECOND DEVICE (H2 GENERATING DEVICE)
18 CO/H2 STRAGE DEVICE
12 FIRST DEVICE (CO/H2 GENERATING DEVICE)
16 POWER CONTROL DISTRIBUTIION DEVICE
20 H2 STRAGE DEVICE

FUEL PRODUCTION SYSTEM

TECHNICAL FIELD

The present invention relates to a fuel production system. More specifically, the present invention relates to a fuel production system that synthesizes fuel from electrolytically-generated $H_2$ and CO.

BACKGROUND ART

For example, Patent Document 1 discloses a power supply unit in which sets priorities of three different types of electric power, namely, clean-generated power, which is generated by using sunlight or wind power as energy, fuel-cell power, which is generated by a fuel cell, and commercial power, which is supplied from an electric power company when supplying them to a power load system. more specifically, the power supply unit is set to preferentially supply the clean-generated power. And the power supply unit additionally supplies the fuel-cell power and commercial power if the clean-generated power is not sufficient to meet power demand of the power load system. This makes it possible to mainly use the clean-generated power as the energy of the power load system, thereby establishing a system that minimizes the influence upon the environment.

For example, Patent Document 2 discloses a system in which produces hydrocarbon (HC) fuel by reacting CO and $H_2$ to Fischer-Tropsch reaction (FT reaction). For example, Patent Document 3 discloses an electrolytic cell comprising an oxygen-ion-conductive film made of a solid oxide electrolyte, and a cathode and an anode disposed on both surface of the film respectively, generating CO and $H_2$ simultaneously by using the electrolytic cell, recovering the generated source gases from the electrolytic cell, and producing HC by reacting the recovered source gases to FT reaction.

RELATED ART LITERATURE

Patent Documents

Patent Document 1: JP-A-2004-120903
Patent Document 2: JP-A-2008-533287
Patent Document 3: JP-A-2009-506213
Patent Document 4: JP-A-9-85044

SUMMARY OF THE INVENTION

Problem to be Solved by the Invention

A combination of technologies described in Patent Documents 1 and 3 makes it possible to preferentially use the clean-generated power and produce HC by simultaneously generating CO and $H_2$ as needed for FT reaction. Meanwhile, in a region where a power supply infrastructure is inadequate (e.g., in a desert region), sufficient commercial power may not be available. The technology described in Patent Document 1 uses fuel-cell power in addition to commercial power. However, the fuel-cell power is generated by using $H_2$ that is obtained when midnight power, that is, surplus commercial power, is used to perform electrolysis on water. In other words, the fuel-cell power is generated on the presumption that the commercial power is available. Therefore, if sufficient commercial power is not available, the aforementioned CO and $H_2$ have to be generated by using the clean-generated power only.

In general, however, natural energy such as the energy from sunlight varies. It means that generated electric power varies. Therefore, if an attempt is made to simultaneously generate CO and $H_2$ with an electrolytic cell described in Patent Document 3 by using only the electric power derived from natural energy, the generation of CO and $H_2$ becomes unstable. When the generation of CO and $H_2$ is unstable, the efficiency of FT reaction, which uses the generated CO and $H_2$, may decrease.

The present invention has been made to solve the above problem. An object of the present invention is to provide a fuel production system that is capable of producing HC with high efficiency by using variable energy.

Means for Solving the Problem

To achieve the above mentioned purpose, a first aspect of the present invention is a fuel production system comprising:
a power generating device that generates variable electric power;
a power distribution device that is connected to the power generating device to distribute electric power to a plurality of electrical loads;
a mixed gas generating device that is one of the electrical loads and performs electrolysis on water and carbon dioxide upon receipt of electric power distributed by the power distribution device to generate a mixed gas made of hydrogen and carbon monoxide; and
a control device that controls the power distribution device so as to supply predetermined electric power to the mixed gas generating device, wherein the predetermined electric power is lower than the minimum power generated by the power generating device within a preselected period of time.

A second aspect of the present invention is the fuel production system according to the first aspect, further comprising:
a mixed gas storage device that is connected to the mixed gas generating device to store the mixed gas; and
a feedback control device that provides feedback control of the predetermined electric power to ensure that the substance quantity ratio between hydrogen and carbon monoxide in the mixed gas storage device coincides with a preselected ratio.

A third aspect of the present invention is the fuel production system according to the first or the second aspect, further comprising:
a hydrogen generating device that is one of the electrical loads and generates hydrogen upon receipt of electric power distributed by the power distribution device; and
a hydrogen power generating device that generates electric power by using hydrogen generated by the hydrogen generating device.

A forth aspect of the present invention is the fuel production system according to the third aspect,
wherein, if the electric power generated by the power generating device is lower than the predetermined electric power while the control device controls the power distribution device to supply the predetermined electric power to the mixed gas generating device, the hydrogen power generating device supplies the generated electric power to the power distribution device.

A fifth aspect of the present invention is the fuel production system according to any one of the first to the forth aspects, further comprising:
a charge/discharge device that is one of the electrical loads and capable of charging and discharging electric power distributed by the power distribution device; and
a mixed gas generating device that generates a mixed gas made of hydrogen and carbon monoxide by performing electrolysis on water and carbon dioxide by using electric power from the charge/discharge device.

A sixth aspect of the present invention is the fuel production system according to any one of the first to the fifth aspects, further comprising:

a carbon dioxide supply device that is one of the electrical loads, recovers carbon dioxide from atmospheric air upon receipt of electric power distributed by the power distribution device, and supplies the recovered carbon dioxide to the mixed gas generating device.

A seventh aspect of the present invention is the fuel production system according to the sixth aspects, wherein the carbon dioxide supply device includes a carbon dioxide recovery device that contains an electrolytic solution having carbon dioxide absorption characteristics.

An eighth aspect of the present invention is the fuel production system according to the seventh aspect, wherein the carbon dioxide supply device includes an atmospheric air introduction device that introduces atmospheric air into the carbon dioxide recovery device, and a liquid supply device that supplies the electrolytic solution in the carbon dioxide recovery device to the mixed gas generating device.

A ninth aspect of the present invention is the fuel production system according to the seventh aspect, further comprising:

an electrolytic solution storage device that is disposed downstream and upward of the carbon dioxide recovery device to temporarily store an electrolytic solution discharged from the mixed gas generating device;

a hydraulic power generation device that includes a turbine rotated by an electrolytic solution dropped from the electrolytic solution storage device, causes the rotated turbine to generate electric power, and if the electric power generated by the power generating device is lower than the predetermined electric power, supplies the generated electric power to the power distribution device; and a liquid supply device that supplies the electrolytic solution dropped from the electrolytic solution storage device to the mixed gas generating device.

A tenth aspect of the present invention is the fuel production system according to the seventh aspect, wherein the carbon dioxide supply device includes a carbon dioxide absorption/regeneration device that is positioned upstream of the carbon dioxide recovery device, and contains an absorbent that has carbon dioxide absorption characteristics, discharges absorbed carbon dioxide when heated, and regenerates the carbon dioxide absorption characteristics when watered.

An eleventh aspect of the present invention is the fuel production system according to the seventh aspect, wherein the carbon dioxide supply device includes a rotating electrical machine disposed upstream of the carbon dioxide recovery device; and wherein the rotating electrical machine includes a turbine, functions as a pressure pump that lets the turbine rotate to compress carbon dioxide and introduce the compressed carbon dioxide into the carbon dioxide recovery device, and if the electric power generated by the power generating device is lower than the predetermined electric power, functions as a power generator that generates electric power by allowing the compressed carbon dioxide in the carbon dioxide recovery device to rotate the turbine in a reverse direction and supplies the generated electric power to the power distribution device.

A twelfth aspect of the present invention is the fuel production system according to any one of the first to the eleventh aspects, wherein the power generating device includes at least one of a solar photovoltaic power generation device, a solar thermal power generation device, a wind power generation device, a tidal power generation device, and a geothermal power generation device.

Advantages of the Invention

According to the first to twelfth aspects of the present invention, the predetermined power, which is lower than the minimum power generated by the power generating device within the predetermined period of time, can be supplied to the mixed gas generating device. The predetermined power corresponds to steady-state power that remains unaffected by variation, which is a portion of electric power generated by the power generating device within the predetermined period of time. When such steady-state power can be supplied to the mixed gas generating device, CO and $H_2$ can be steadily generated. When CO and $H_2$ are steadily generated, HC can be produced by allowing the FT reaction to progress efficiently. This makes it possible to produce HC with high efficiency by using variable energy.

MODE FOR CARRYING OUT THE INVENTION

First Embodiment
[Description of System Configuration]

Figure 1:
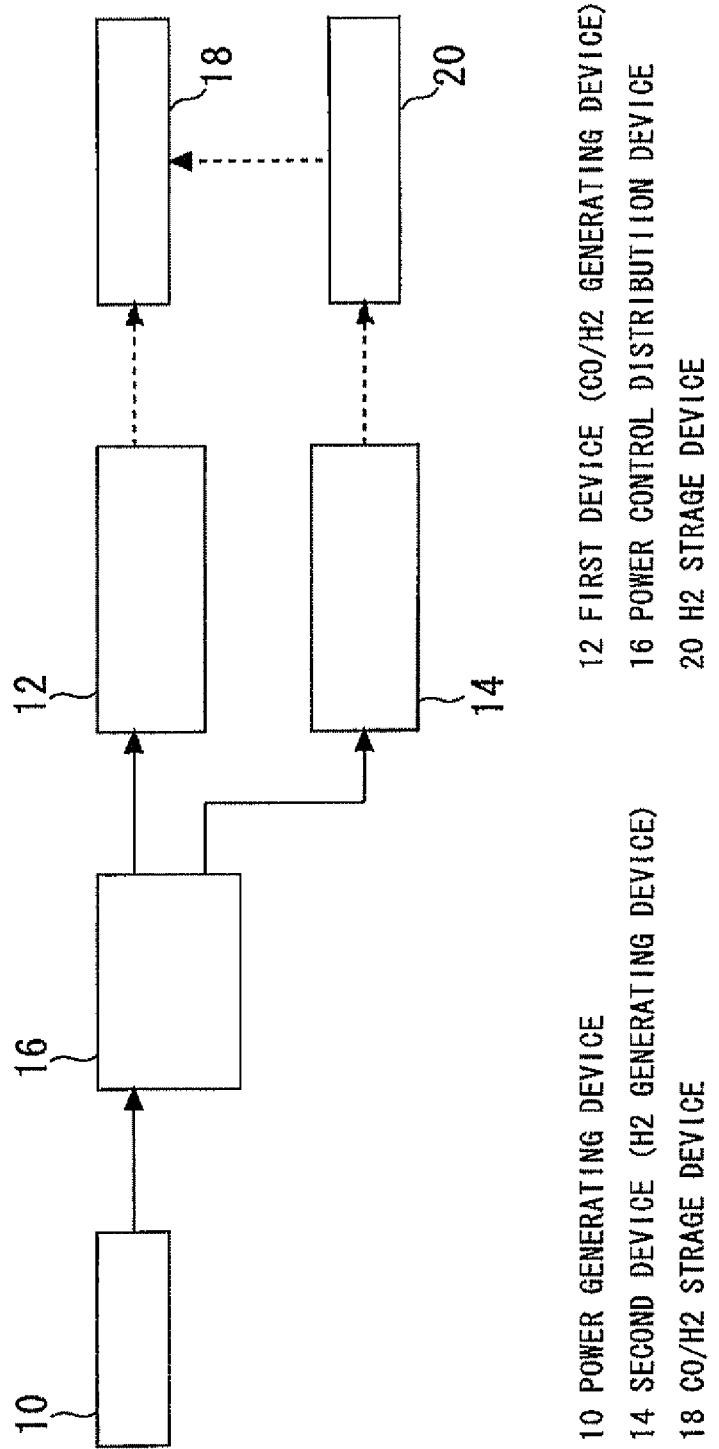
FIG. 1 is a block diagram illustrating a configuration of a system according to a first embodiment.

First of all, a first embodiment of the present invention will be described with reference to FIGS. 1 to 4. FIG. 1 is a block diagram illustrating the configuration of a system according to the first embodiment of the present invention. The system shown in FIG. 1 includes a power generating device 10, which generates electric power by using natural energy (provides, for instance, solar photovoltaic power generation, solar thermal power generation, wind power generation, tidal power generation, or geothermal power generation). The system shown in FIG. 1 also includes a first device 12 and a second device 14.

The first device 12 is a $CO/H_2$ generating device that simultaneously generates CO and $H_2$ by performing electrolysis on $CO_2$ and water. Specifically, the first device 12 includes an electrolytic tank, a working electrode (WE), a counter electrode (CE), a reference electrode (RE), and a potentiostat. The electrolytic tank is filled with an electrolytic solution in which $CO_2$ is dissolved. The WE, the CE, and the RE are provided in the electrolytic tank. The potentiostat is configured so that the voltage of the WE relative to the RE can be changed. The second device 14 is a $H_2$ generating device that generates $H_2$ by performing electrolysis on water. The second device 14 has the same configuration as the first device 12 except that the electrolytic solution is a mixture of water and supporting electrolyte.

Further, the system shown in FIG. 1 includes a power control distribution device 16, which receives electric power from the power generating device 10 and distributes the received electric power to the first device 12 and the second device 14. The power control distribution device 16 includes a controller (not shown), which provides power distribution control and mixture ratio feedback control as described later. Furthermore, the system shown in FIG. 1 includes a $CO/H_2$ storage device 18, which stores CO and $H_2$ that are generated by the first device 12; and a $H_2$ storage device 20, which stores $H_2$ that is generated by the second device 14. The $CO/H_2$ storage device 18 is connected to the $H_2$ storage device 20 through a normally-closed valve (not shown), such as a check valve or a reed valve. When the pressure within the $H_2$ storage device 20 exceeds a predetermined working pressure, $H_2$ in the $H_2$ storage device 20 is introduced into the $CO/H_2$ storage device 18.

[Electrolysis in the First Device 12]

Electrolysis reactions in the first device 12 will now be described. When the potentiostat in the first device 12 is controlled so as to flow an electric current between the WE and the CE, electrochemical reactions occur in the WE and the CE as indicated by formulas (1) to (3) below:

$$WE: CO_2 + 2H^+ + 2e^- \rightarrow CO + H_2O \quad (1)$$

$$2H^+ + 2e^- \rightarrow H_2 \quad (2)$$

$$CE: 2H_2O \rightarrow O_2 + 4H^+ + 4e^- \quad (3)$$

As indicated by formulas (1) and (2) above, CO and $H_2$ are simultaneously generated on the WE in the first device 12. Therefore, when the generated CO and $H_2$ are collected into the $CO/H_2$ storage device 18 to invoke an FT reaction, HC can be produced as an alternative to fossil fuel.

Meanwhile, the generation ratio between CO and $H_2$ on the WE depends on an electric current value between the WE and the CE, that is, a WE voltage setting relative to the RE. Further, energy efficiency (the amount of heat generated by products relative to input energy, the same shall apply hereinafter) depends on the WE voltage setting relative to the RE. Such dependence will now be described with reference to FIGS. 2(A) and 2(B). FIG. 2(A) shows the relationship between a WE voltage relative to the RE and the generation ratio between CO and $H_2$. FIG. 2(B) shows the relationship between the WE voltage relative to the RE and the energy efficiency.

In general, $H_2$ is generated at an absolute potential of 0.11 V, which is lower than the potential at which CO is generated.

Therefore, in a region of FIG. 2(A) where the voltage is low, the amount of generated $H_2$ is relatively large. Hence, the generation ratio of $CO/H_2$ becomes low. When, in contrast, the voltage is high, the amount of generated CO can be larger than that in a region where the voltage is low. Hence, the generation ratio of $CO/H_2$ is high. In other words, as indicated in FIG. 2(A), the generation ratio of $CO/H_2$ becomes low when the WE voltage is set to be low relative to the RE and becomes high when the WE voltage is set to be high relative to the RE.

Meanwhile, the energy efficiency exhibits characteristics that differ from the characteristics exhibited by the generation ratio of $CO/H_2$. The fact that the WE voltage is low relative to the RE means that the input energy is small. In a region of FIG. 2(B) where the voltage is low, therefore, the energy efficiency increases with a decrease in the voltage. Meanwhile, as described with reference to FIG. 2(A), the generation ratio of $CO/H_2$ is high in a region where the voltage is high. However, the amount of heat generated by CO (283 kJ/mol) is generally larger than the amount of heat generated by $H_2$ (242 kJ/mol). Therefore, the amount of heat generated by the products increases with an increase in the generation ratio of $CO/H_2$. In other words, the energy efficiency exhibits characteristics that bulge downward as shown in FIG. 2(B).

[Electrolysis in the Second Device 14]

Electrolysis reactions in the second device 14 will now be described in comparison with the electrolysis reactions in the first device 12. When the potentiostat in the second device 14 is controlled so as to flow an electric current between the WE and the CE, electrochemical reactions occur in the WE and CE as indicated by formulas (4) and (5) below:

$$WE: 2H^+ + 2e^- \rightarrow H_2 \quad (4)$$

$$CE: 2H_2O \rightarrow O_2 + 4H^+ + 4e^- \quad (5)$$

The reaction indicated by formula (4) above is the same as the reaction indicated by formula (2), whereas the reaction indicated by formula (5) above is the same as the reaction indicated by formula (3).

FIG. 3(A) shows the relationship between the WE voltage relative to the RE and the generation ratio between CO and $H_2$. FIG. 3(B) shows the relationship between the WE voltage relative to the RE and the energy efficiency. As indicated by formula (4), only $H_2$ is generated on the WE in the second device 14. Therefore, the generation ratio of $H_2$ remains constant (=1.0) irrespective of the WE voltage relative to the RE, as shown in FIG. 3(A). Increasing the WE voltage relative to the RE increases the amount of generated $H_2$. Hence, the energy efficiency of electrolysis does not significantly vary as shown in FIG. 3(B).

[Power Distribution Control in the First Embodiment]

Figure 2:
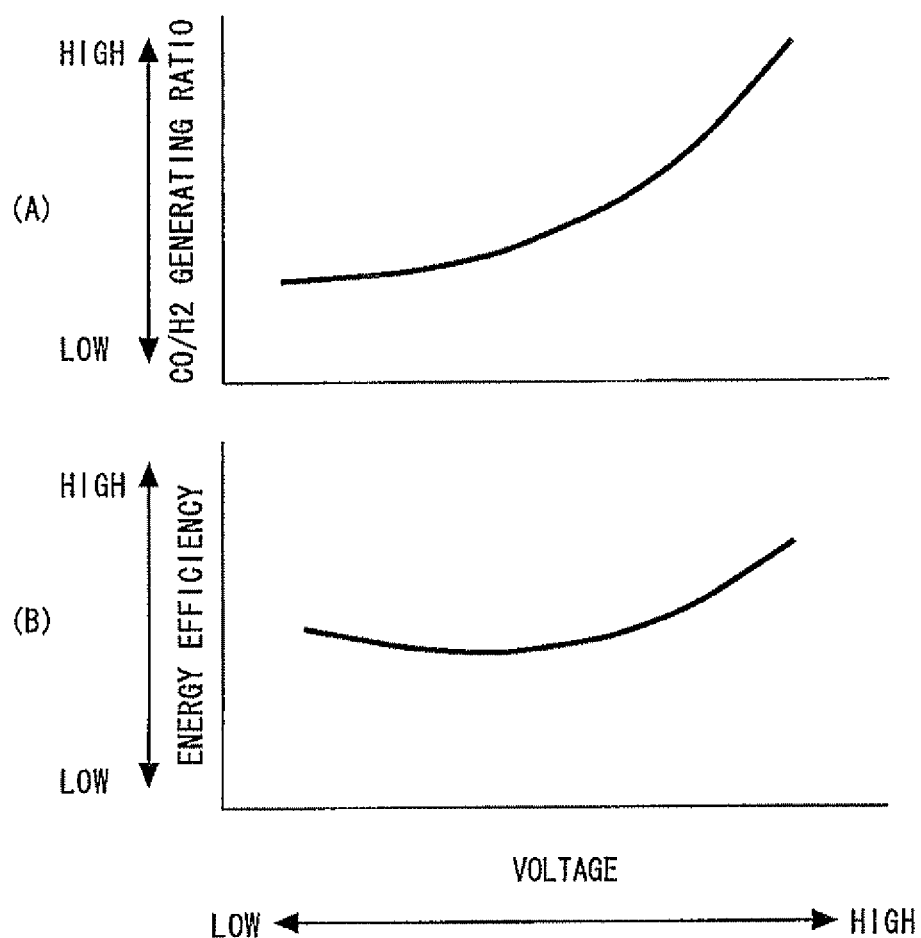
FIG. 2 shows (A) a relationship between a WE voltage relative to the RE and a generation ratio between CO and $H_2$ in a first device 12, and (B) a relationship between the WE voltage relative to the RE and the energy efficiency in the first device 12 respectively.
Figure 3:
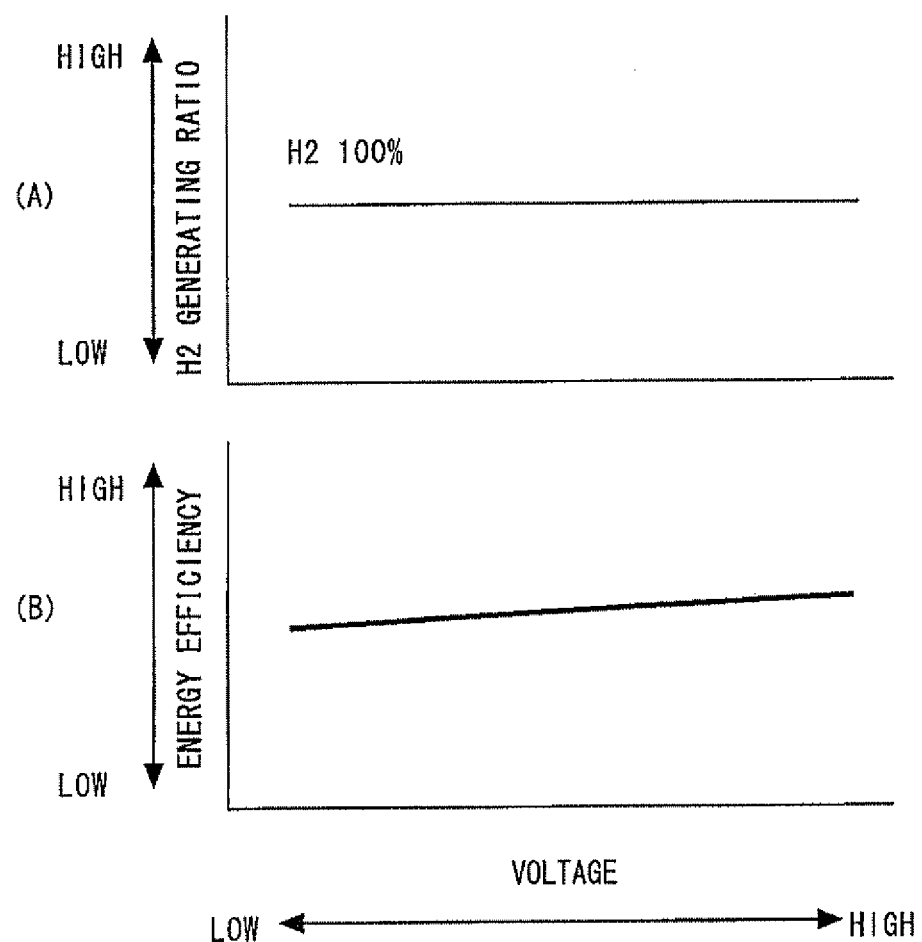
FIG. 3 shows (A) a relationship between a WE voltage relative to the RE and a generation ratio between CO and $H_2$ in a second device 14, and (B) a relationship between the WE voltage relative to the RE and the energy efficiency in the second device 14 respectively.

As is obvious from FIGS. 2 and 3, the generation ratio of $CO/H_2$ and energy efficiency in the first device 12 vary with the WE voltage relative to the RE, and the degree of such variation is greater than that in the second device 14. Therefore, when electric power derived from natural energy is used as in the present embodiment, the first device 12 is significantly affected by such variation. As such being the case, the present embodiment exercises power distribution control so as to supply a steady-state portion of generated electric power to the first device 12 and supply the remaining variable portion to the second device 14.

Figure 4:
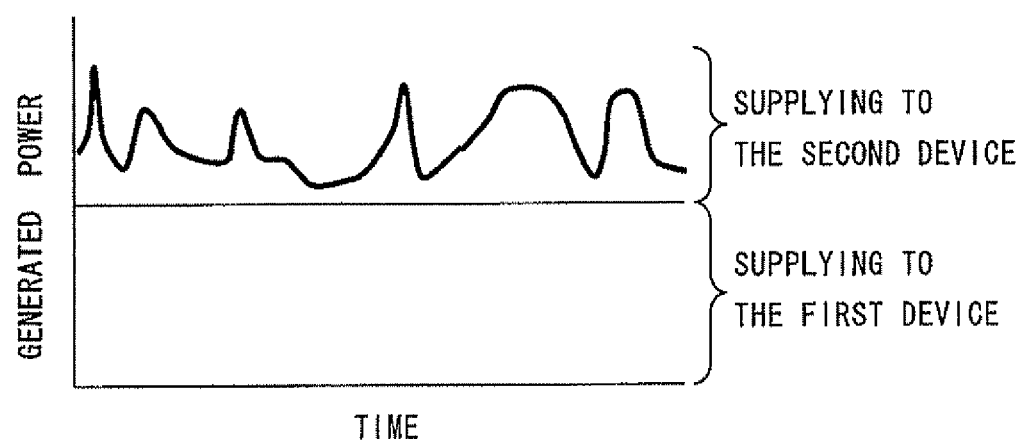
FIG. 4 shows an example of power distribution control of the first embodiment.

FIG. 4 shows an example of power distribution control that is provided by the present embodiment. The curve in FIG. 4 indicates changes in natural energy electric power. The present embodiment exercises power distribution control so as to supply steady-state power, which is indicated by a straight line below the curve, to the first device 12, and supply variable electric power, which is indicated by the curve, to the second device 14. When such power distribution control is exercised, substantially constant power can be preferentially supplied to the first device 12 in which energy efficiency increases with a decrease in the degree of electric power variation, and variable electric power can be supplied to the second device 14 in which the influence upon energy efficiency is relatively small.

When power distribution control is exercised as described above, electric power can be supplied to the devices in accordance with their characteristics. Therefore, a decrease in energy efficiency can be effectively reduced while making effective use of variable electric power. Consequently, the system according to the present embodiment makes it possible to produce HC with the enhanced energy efficiency concerning HC production.

In the first embodiment, which has been described above, the power control distribution device 16 corresponds to the "power distribution device" according to the first aspect of the present invention; the first device 12 ($CO/H_2$ generating device) corresponds to the "mixed gas generating device" according to the first aspect of the present invention; and the controller in the power control distribution device 16 corresponds to the "control device" according to the first aspect of the present invention.

Second Embodiment

A second embodiment of the present invention will now be described with reference to FIGS. 5(A) and 5(B). The second embodiment is characterized in that mixture ratio feedback control is exercised as described later when the above-described power distribution control is provided by the system according to the first embodiment. Elements of the system and the method of power distribution control will not be redundantly described because they are the same as those described in connection with the first embodiment.

[Mixture Ratio Feedback Control in the Second Embodiment]

In the first embodiment, which has been described earlier, power distribution control is exercised so as to suppress a decrease in energy efficiency. However, this power distribution control is exercised in consideration of energy efficiency in an electrolysis process, which is a part of a HC production process, but is not exercised in consideration of energy efficiency in the overall process of HC production. It is understood that the energy efficiency is high during FT reaction when the mixture ratio of $CO/H_2$, that is, the mixture ratio between CO and $H_2$, which are reactants in the FT reaction, is 1/2.

In the present embodiment, therefore, the generation ratio of $CO/H_2$, that is, the generation ratio between CO and $H_2$, which are simultaneously generated on the WE of the first device 12, is set to be 1/2 in consideration of the energy efficiency during the FT reaction. As described with reference to FIG. 2(A), the $CO/H_2$ generation ratio prevailing on the WE depends on the WE voltage setting relative to the CE of the first device 12. Therefore, it is possible to preset a voltage value at which the generation ratio of $CO/H_2$ is 1/2.

However, when the above power distribution control is exercised, electric power remaining after the electric power supplied to the first device 12 is subtracted from the electric power generated by the power generating device 10, is supplied to the second device 14. Therefore, $H_2$ is generated in the second device 14 and introduced into the $CO/H_2$ storage device 18 through the $H_2$ storage device 20. In other words, even when the generation ratio of $CO/H_2$ is set to be 1/2 in the first device 12, the mixture ratio between CO and $H_2$ in the $CO/H_2$ storage device 18 varies with $H_2$ generated in the second device 14.

Hence, the present embodiment detects the mixture ratio between CO and $H_2$ in the $CO/H_2$ storage device 18 and exercises mixture ratio feedback control in which the result of the detection is fed back to the electric power to be distributed. FIGS. 5(A) and 5(B) show examples of mixture ratio feedback control that is exercised in the present embodiment. The broken line in FIG. 5(A) indicates electric power to be supplied to the first device 12. The cumulative ratio of $CO/H_2$, which is shown in FIG. 5(B), represents the mixture ratio between CO and $H_2$ in the $CO/H_2$ storage device 18.

Figure 5:
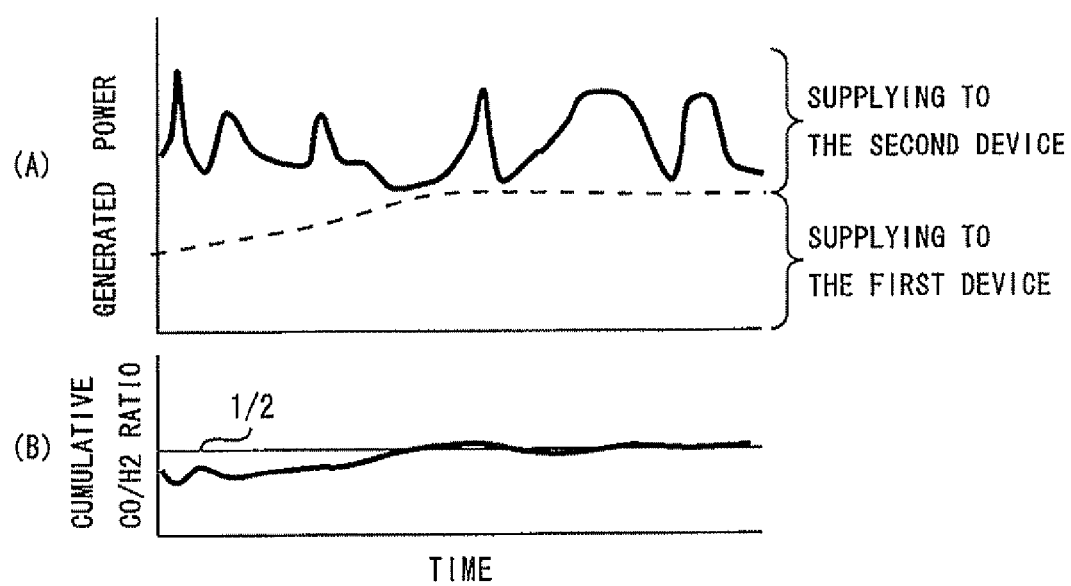
FIG. 5 shows examples of mixture ratio feedback control that is exercised in a second embodiment.

If the cumulative ratio of $CO/H_2$ is smaller than 1/2 as shown in FIG. 5(B), a change is made to increase the electric power to be supplied to the first device 12 as shown in FIG. 5(A). As explained with reference to FIG. 2(A), the amount of generated CO can be increased by increasing the WE voltage relative to the CE in the first device 12. In other words, when the electric power to be supplied to the first device 12 is changed to increase, the generation ratio of $CO/H_2$ can be increased.

According to the above-described power distribution control, the electric power to be supplied to the first device 12 can be changed in accordance with the cumulative ratio of $CO/H_2$. Therefore, the mixture ratio of $CO/H_2$ in the $CO/H_2$ storage device 18 can be rendered close to 1/2. It means that CO and $H_2$ in the $CO/H_2$ storage device 18 can be directly subjected to FT reaction. Hence, the energy efficiency in the overall HC production process can be increased.

In the second embodiment, which has been described above, the $CO/H_2$ storage device 18 corresponds to the "mixed gas storage device" according to the second aspect of the present invention; and the controller in the power control distribution device 16 corresponds to the "feedback control device" according to the second aspect of the present invention.

Third Embodiment

Figure 6:
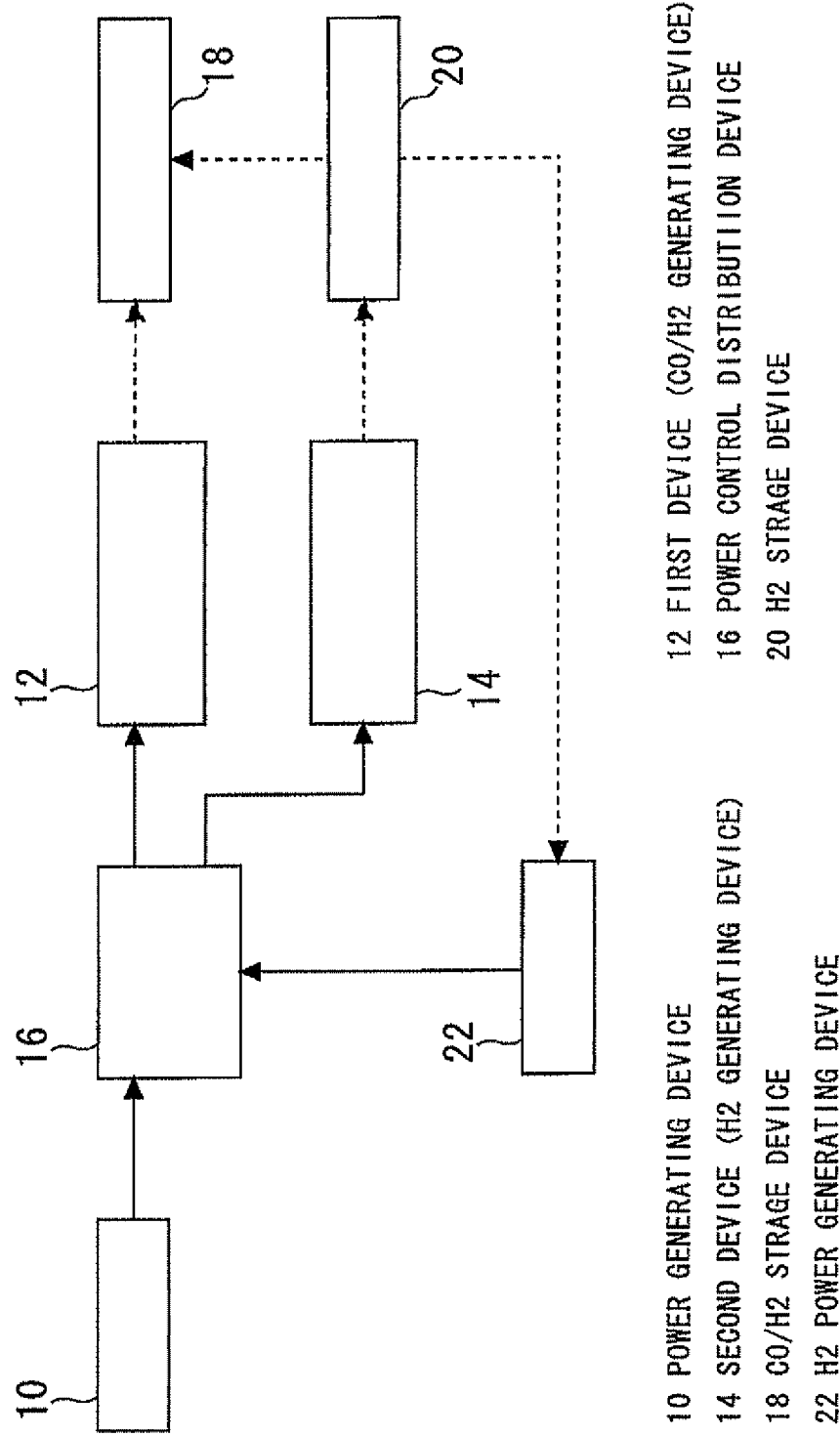
FIG. 6 is a block diagram illustrating a configuration of a system according to a third embodiment.

A third embodiment of the present invention will now be described with reference to FIG. 6. The system according to the third embodiment is obtained by adding a $H_2$ power generating device, which generates electric power by using $H_2$ as an energy source, to the system according to the first embodiment. The third embodiment is characterized in that power supply control is exercised as described later when the above-described power distribution control is exercised. Elements of the system except for the $H_2$ power generating device and the method of power distribution control will not be redundantly described because they are the same as those described in connection with the first embodiment.

[Power Supply Control in the Third Embodiment]

The first embodiment suppresses a decrease in energy efficiency by exercising power distribution control. However, as the system according to the first embodiment uses electric power derived from natural energy, the electric power to be supplied to the first device 12 may significantly decrease even when power distribution control is being exercised.

As such being the case, the third embodiment uses a $H_2$ power generating device 22 that is installed downstream of the $H_2$ storage device 20 to generate electric power by using $H_2$. The third embodiment exercises power supply control so that the electric power generated by the $H_2$ power generating device 22 is supplied to the power control distribution device 16 when the amount of electric power generated by the power generating device 10 is decreased. This power supply control is exercised in accordance with a control signal from a controller (not shown). Electric power generation by the $H_2$ power generating device 22 may be gas turbine power generation, steam turbine power generation, fuel cell power generation, or a combination of these.

Exercising power supply control as described above makes it possible to compensate for changes in natural energy power generation. Therefore, stable electric power can be supplied to the first device 12. Further, when the power supply control is exercised, $H_2$ in the $H_2$ storage device 20 does not flow toward the $CO/H_2$ storage device 18, but is consumed by the $H_2$ power generating device 22. Consequently, the mixture ratio between CO and $H_2$ in the $CO/H_2$ storage device 18 can be adjusted to increase the ratio of CO with an increased degree of freedom. As a result, the first device 12 can be operated with ease.

In the third embodiment, which has been described above, the second device 14 ($H_2$ generating device) corresponds to the "hydrogen generating device" according to the third aspect of the present invention; and the $H_2$ power generating device 22 corresponds to the "hydrogen power generating device" according to the third aspect of the present invention.

Fourth Embodiment

A fourth embodiment of the present invention will now be described with reference to FIGS. 7(A) and 7(B). The fourth embodiment is characterized in that power supply control and mixture ratio feedback control are exercised as described later when the above-described power distribution control is provided by the system according to the third embodiment. Elements of the system and the method of power distribution control will not be redundantly described because they are the same as those described in connection with the third embodiment.

[Power Supply Control and Mixture Ratio Feedback Control in the Fourth Embodiment]

When the amount of electric power generated by the power generating device 10 is decreased, the third embodiment compensates for changes in natural energy power generation by exercising power supply control in which the electric power generated by the $H_2$ power generating device 22 is supplied to the power control distribution device 16. In contrast, the present embodiment exercises power supply control in which the electric power generated by the $H_2$ power generating device 22 is constantly supplied to the power control distribution device 16. This power supply control is exercised in accordance with a control signal from a controller (not shown). Further, the present embodiment detects the mixture ratio between CO and $H_2$ in the $CO/H_2$ storage device 18 and exercises mixture ratio feedback control in which the result of the detection is fed back to the electric power to be distributed, as is the case with the second embodiment.

Figure 7:
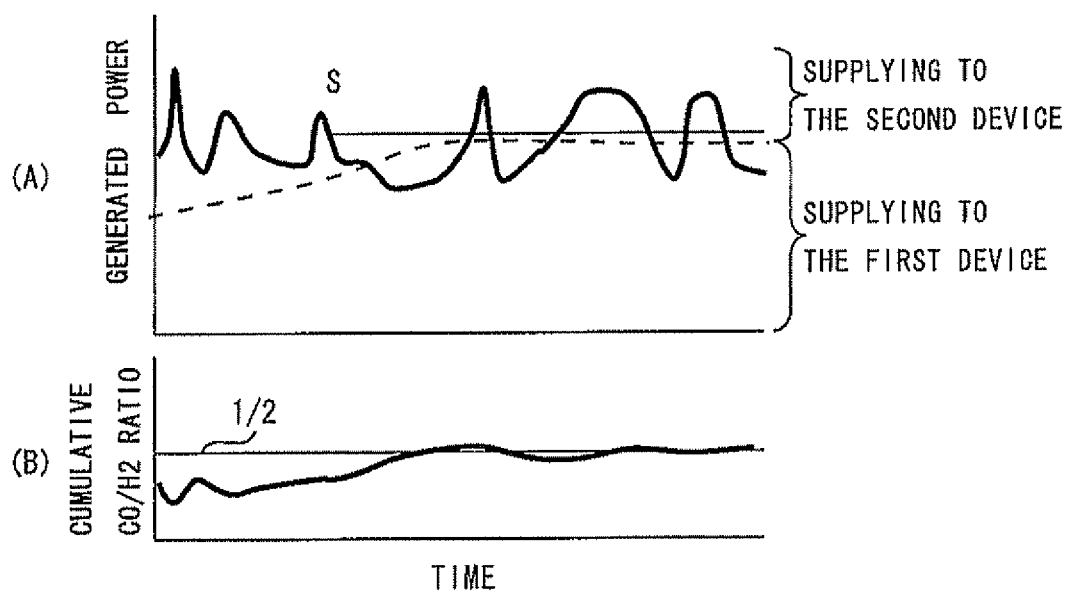
FIG. 7 shows an example of power distribution control of a forth embodiment and an example of mixture ratio feedback control of the forth embodiment.

FIGS. 7(A) and 7(B) show examples of power supply control and mixture ratio feedback control that are exercised by the present embodiment. The broken line in FIG. 7(A) indicates electric power to be supplied to the first device 12. The cumulative ratio of $CO/H_2$, which is shown in FIG. 7(B), represents the mixture ratio between CO and $H_2$ in the $CO/H_2$ storage device 18.

When power supply control is initiated at point S shown in FIG. 7(A), changes in natural energy electric power can be compensated for to some extent. Therefore, an alterable upper-limit value of electric power can be increased during mixture ratio feedback control. Hence, if the cumulative ratio of $CO/H_2$ is smaller than 1/2 as shown in FIG. 7(B), a change is made to increase the electric power to be supplied to the first device 12 as shown in FIG. 7(A). Consequently, the generation ratio of $CO/H_2$ can be increased until it is close to 1/2.

According to the above-described power supply control and mixture ratio feedback control, the electric power to be supplied to the first device 12 can be changed in accordance with the cumulative ratio of $CO/H_2$ while compensating for changes in the natural energy electric power. Therefore, the alterable upper-limit value of electric power can be increased. Thus, the mixture ratio of $CO/H_2$ in the $CO/H_2$ storage device 18 can be accurately rendered close to 1/2. Consequently, CO and $H_2$ in the $CO/H_2$ storage device 18 can be directly subjected to FT reaction. This makes it possible to further increase the energy efficiency in the overall HC production process.

Fifth Embodiment

Figure 8:
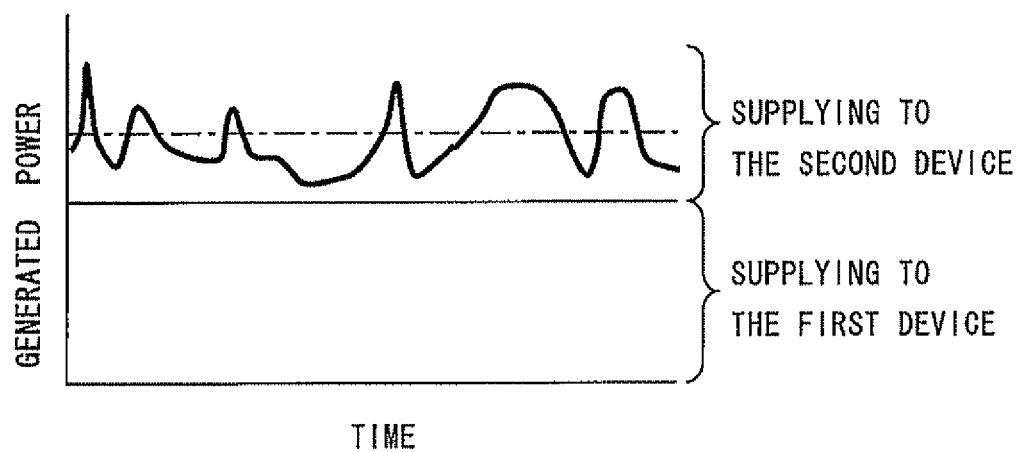
FIG. 8 shows an example of power distribution control of a fifth embodiment.

A fifth embodiment of the present invention will now be described with reference to FIG. 8. The fifth embodiment is characterized in that power distribution control is exercised as described later with the $H_2$ generating device according to the first embodiment replaced by a later-described $CO/H_2$ generating device. Elements of the system except for the $CO/H_2$ generating device will not be redundantly described because they are the same as those described in connection with the first embodiment.

[Power Distribution Control in the Fifth Embodiment]

The second device 14 used in the present embodiment is the same $CO/H_2$ generating device as the first device 12. An electrical storage device is combined with a power supply section of the second device 14. Therefore, changes in the electric power to be supplied to the second device 14 can be smoothed to some extent by the electrical storage device although a certain loss occurs due to electric power input and output. FIG. 8 shows an example of power distribution control that is provided by the present embodiment. The curve in FIG. 8 indicates changes in natural energy electric power. The present embodiment exercises the same power distribution control as the first embodiment. In the present embodiment, however, smoothed steady-state electric power indicated by the one-dot chain line in FIG. 8 is supplied to the second device 14 from the electrical storage device. Therefore, CO and $H_2$ can be generated with high energy efficiency not only in the first device 12 but also in the second device 14.

In the fifth embodiment, which has been described above, the second device 14 ($CO/H_2$ generating device) corresponds to the "mixed gas generating device" according to the fifth aspect of the present invention; and the electrical storage device in the second device 14 corresponds to the "charge/discharge device" according to the fifth aspect of the present invention.

Sixth Embodiment

Figure 9:
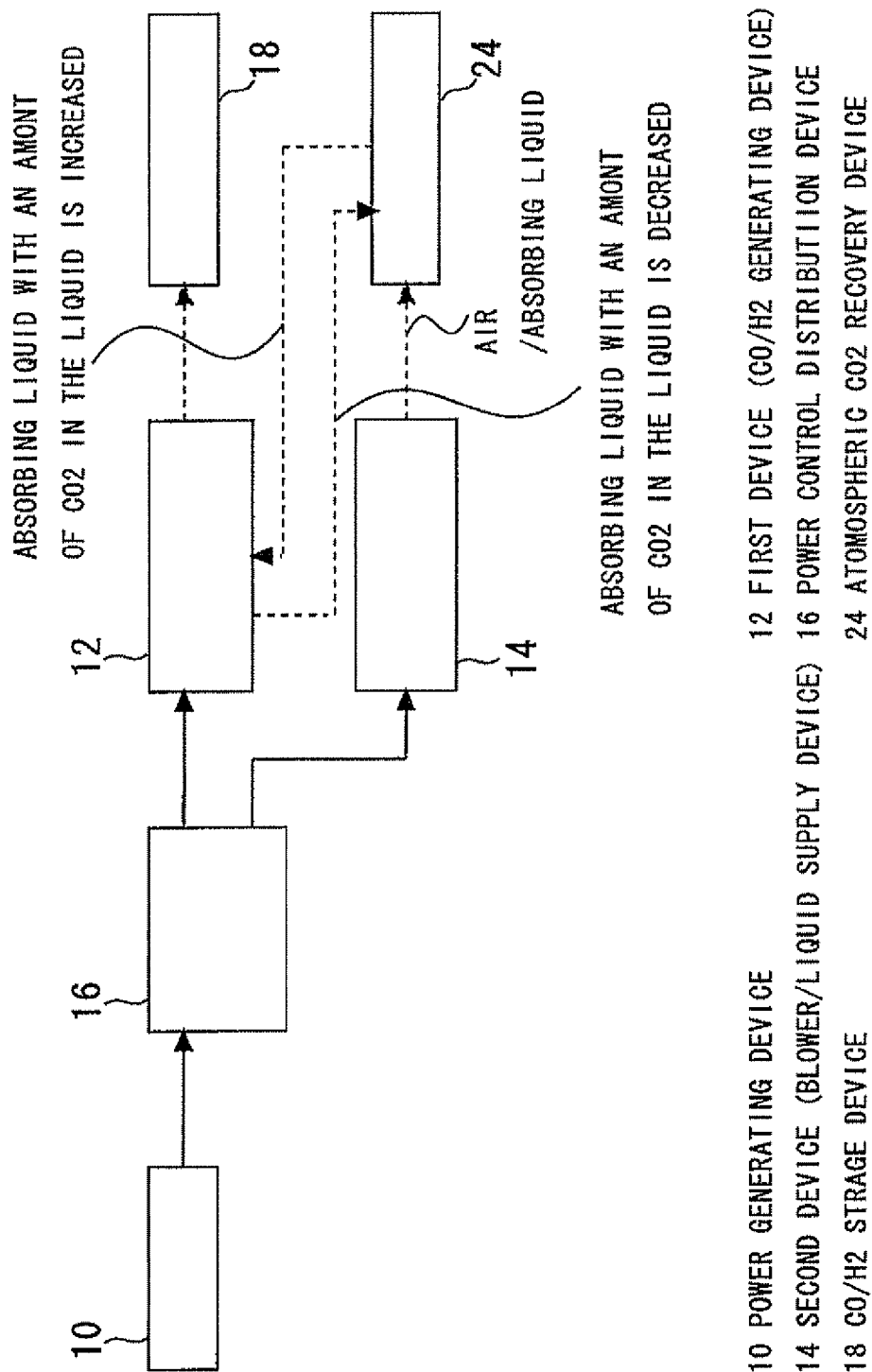
FIG. 9 is a block diagram illustrating a configuration of a system according to a sixth embodiment.

A sixth embodiment of the present invention will now be described with reference to FIG. 9. The sixth embodiment is characterized in that power distribution control and electrolytic solution supply control are exercised as described later with the $H_2$ generating device according to the first embodiment replaced by a later-described blower/liquid supply device and with the $H_2$ storage device 20 replaced by a later-described atmospheric $CO_2$ recovery device. Elements of the system except for the above-mentioned devices will not be redundantly described because they are the same as those described in connection with the first embodiment.

As explained in connection with the first embodiment, the first device 12 includes an electrolytic tank that is filled with an electrolytic solution in which $CO_2$ is dissolved. Therefore, when an electric current flows between the WE and the CE, $CO_2$ undergoes electrolysis to generate CO. However, the amount of $CO_2$ in the electrolytic solution decreases as CO is generated. To steadily generate CO, therefore, it is necessary to additionally introduce $CO_2$ into the electrolytic tank from the outside. Hence, as shown in FIG. 9, the present embodiment includes the blower/liquid supply device as the second device 14.

The second device 14 is combined with an atmospheric $CO_2$ recovery device 24 so as to perform a function of supplying an electrolytic solution to the first device 12. When functioning as the liquid supply device, the second device 14 is a liquid supply pump that supplies a $CO_2$ absorbing liquid/electrolytic solution to the first device 12 through the atmospheric $CO_2$ recovery device 24. In this instance, the atmospheric $CO_2$ recovery device 24 functions as a storage tank that temporarily stores the $CO_2$ absorbing liquid/electrolytic solution. When functioning as the blower, in contrast, the second device 14 is a blower pump that introduces $CO_2$ in the atmosphere into the atmospheric $CO_2$ recovery device 24. In this instance, the atmospheric $CO_2$ recovery device 24 contains the $CO_2$ absorbing liquid/electrolytic solution, and functions as a liquid supply pump that supplies to the first device 12 the $CO_2$ absorbing liquid/electrolytic solution in which $CO_2$ is dissolved.

[Power Distribution Control and Electrolytic Solution Supply Control in the Sixth Embodiment]

Meanwhile, supplying variable electric power to the second device 14 (or the atmospheric $CO_2$ recovery device 24) varies the amount of $CO_2$ to be dissolved in the absorbing liquid/electrolytic solution within the atmospheric $CO_2$ recovery device 24 and the amount of $CO_2$ absorbing liquid/electrolytic solution to be supplied to the first device 12. Thus, the changes in the amount of $CO_2$ and in the amount of $CO_2$ absorbing liquid/electrolytic solution may affect the generation ratio of $CO/H_2$ and energy efficiency in the first device 12. However, the influence of the changes in the amount of $CO_2$ and in the amount of $CO_2$ absorbing liquid/electrolytic solution is smaller than the influence of changes in the electric power to be supplied to the first device 12.

As such being the case, the present embodiment exercises power distribution control so as to supply a steady-state portion of electric power generated by the power generating device 10 to the first device 12 and supply the remaining variable portion to the second device 14 (or the atmospheric $CO_2$ recovery device 24). In addition, the present embodiment exercises electrolytic solution supply control so as to collectively supply the electrolytic solution to the first device 12 when a certain $CO_2$ concentration is reached in the atmospheric $CO_2$ recovery device 24. This electrolytic solution supply control is exercised in accordance with a control signal from a controller (not shown). Exercising the above-described power distribution control and electrolytic solution supply control makes it possible to minimize the influence of the variable electric power upon the generation ratio of $CO/H_2$ and energy efficiency.

As described above, the system according to the present embodiment can additionally supply $CO_2$ to the first device 12. Therefore, the first device 12 can steadily generate CO. Further, when the power distribution control and electrolytic solution supply control according to the present embodiment are exercised, CO and $H_2$ can be generated while minimizing the influence of the variable electric power upon the generation ratio of $CO/H_2$ and energy efficiency.

In the sixth embodiment, which has been described above, the second device 14 (blower/liquid supply device) and the atmospheric $CO_2$ recovery device 24 correspond to the "carbon dioxide supply device" according to the sixth aspect of the present invention.

Further, in the sixth embodiment, which has been described above, the second device 14 (liquid supply device) or the atmospheric $CO_2$ recovery device 24 operated when the second device 14 functions as a blower device corresponds to the "carbon dioxide recovery device" according to the seventh aspect of the present invention.

Furthermore, in the sixth embodiment, which has been described above, the second device 14 (blower device) corresponds to the "atmospheric air introduction device" according to the eighth aspect of the present invention; and the atmospheric $CO_2$ recovery device 24 operated when the second device 14 functions as a blower device corresponds to the "liquid supply device" according to the eighth aspect of the present invention.

Seventh Embodiment

Figure 10:
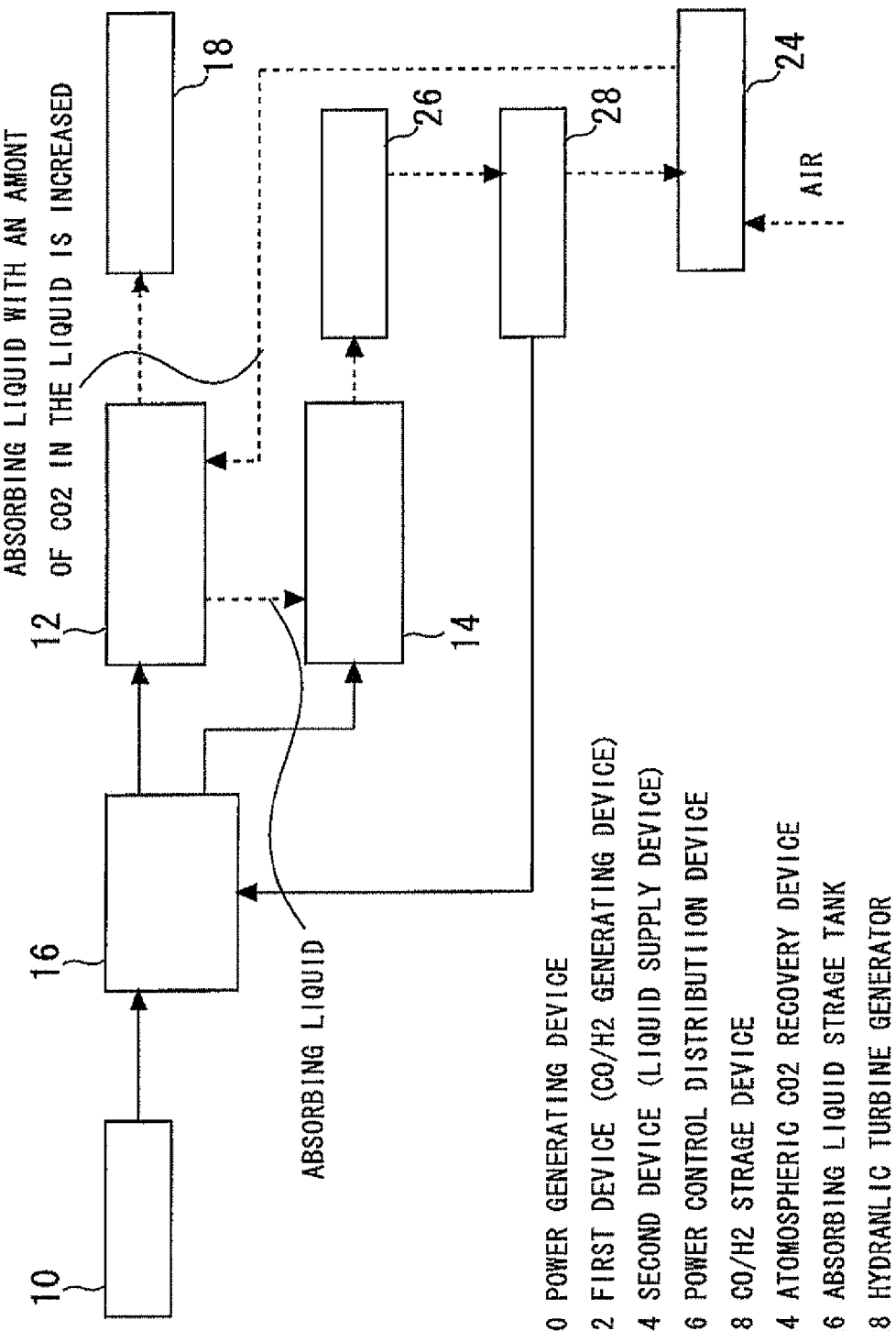
FIG. 10 is a block diagram illustrating a configuration of a system according to a seventh embodiment.

A seventh embodiment of the present invention will now be described with reference to FIG. 10. The system according to the seventh embodiment is characterized in that the blower/liquid supply device according to the sixth embodiment is replaced by a liquid supply device, and that an absorbing liquid storage tank and a hydraulic turbine generator are added between the liquid supply device and the atmospheric $CO_2$ recovery device 24, and further that a $CO_2$ absorbing liquid/electrolytic solution circulates between the above-mentioned added hardware and the first device 12. The system according to the present embodiment is also characterized in that later-described power supply control is exercised when the earlier-described power distribution control and electrolytic solution supply control are exercised. Elements of the system except for the liquid supply device, absorbing liquid storage tank, and hydraulic turbine generator, and the methods of power distribution control and electrolytic solution supply control will not be redundantly described because they are the same as those described in connection with the sixth embodiment.

As described in connection with the sixth embodiment, the amount of $CO_2$ in the electrolytic solution decreases as CO is generated. To steadily generate CO, it is necessary to additionally introduce $CO_2$ into the electrolytic tank from the outside. Hence, as shown in FIG. 10, the present embodiment includes the liquid supply device as the second device 14. The second device 14 is combined with an absorbing liquid storage tank 26, a hydraulic turbine generator 28, and the atmospheric $CO_2$ recovery device 24 to perform a function of supplying the $CO_2$ absorbing liquid/electrolytic solution to the first device 12.

More specifically, the second device 14 functions as a liquid lift pump that lifts the $CO_2$ absorbing liquid/electrolytic solution to the absorbing liquid storage tank 26, which is positioned higher than the first device 12. The absorbing liquid storage tank 26 functions as a storage tank that temporarily stores the $CO_2$ absorbing liquid/electrolytic solution. The hydraulic turbine generator 28 functions as a hydraulic power generation device that generates electric power by allowing a turbine to be rotated by the potential energy of the $CO_2$ absorbing liquid/electrolytic solution when it flows downward by gravity from the absorbing liquid storage tank 26. The atmospheric $CO_2$ recovery device 24 functions as a liquid supply pump that supplies the $CO_2$ absorbing liquid/electrolytic solution to the first device 12. As the first device 12 is connected to the second device 14, the $CO_2$ absorbing liquid/electrolytic solution flows again into the second device 14 after being discharged from the first device 12.

Further, as described in connection with the sixth embodiment, supplying variable electric power to the second device 14 varies the amount of $CO_2$ absorbing liquid/electrolytic solution to be supplied to the first device 12. Therefore, changes in the amount of $CO_2$ absorbing liquid/electrolytic solution may affect the generation ratio of $CO/H_2$ and energy efficiency in the first device 12. Hence, the absorbing liquid storage tank 26 used in the present embodiment has a sufficient volumetric capacity. This makes it possible to absorb the changes in the amount of $CO_2$ absorbing liquid/electrolytic solution, which occur when variable electric power is supplied. Consequently, the influence of variable electric power upon the generation ratio of $CO/H_2$ and energy efficiency can be successfully eliminated.

[Power Supply Control in the Seventh Embodiment]

Moreover, as described in connection with the third embodiment, the electric power to be supplied to the first device 12 may significantly decrease while power distribution control is being exercised. Therefore, when the amount of electric power generated by the power generating device 10 is decreased, the present embodiment exercises power supply control so as to supply the electric power generated by the hydraulic turbine generator 28 to the power control distribution device 16. This power supply control is exercised in accordance with a control signal from a controller (not shown). Exercising power supply control in the manner described above makes it possible to compensate for changes in natural energy power generation. Thus, electric power can be steadily supplied to the first device 12. Consequently, the present embodiment provides substantially the same advantages as the third embodiment.

As described above, the system according to the present embodiment can additionally supply $CO_2$ to the first device 12. Therefore, the first device 12 can steadily generate CO. Further, the absorbing liquid storage tank 26 used in the system according to the present embodiment has a sufficient volumetric capacity. Therefore, the influence of variable electric power upon the generation ratio of $CO/H_2$ and energy efficiency can be successfully eliminated. In addition, the present embodiment exercises power supply control in such a manner as to compensate for changes in natural energy power generation. Thus, electric power can be steadily supplied to the first device 12. Consequently, the mixture ratio between CO and $H_2$ in the $CO/H_2$ storage device 18 can be adjusted to increase the ratio of CO with an increased degree of freedom. As a result, the first device 12 can be operated with ease.

In the seventh embodiment, which has been described above, the second device 14 (liquid supply device), the absorbing liquid storage tank 26, the hydraulic turbine generator 28, and the atmospheric $CO_2$ recovery device 24 correspond to the "carbon dioxide supply device" according to the sixth aspect of the present invention.

Further, in the seventh embodiment, which has been described above, the atmospheric $CO_2$ recovery device 24 corresponds to the "carbon dioxide recovery device" according to the seventh aspect of the present invention.

Furthermore, in the seventh embodiment, which has been described above, the absorbing liquid storage tank 26 corresponds to the "electrolytic solution storage device" according to the ninth aspect of the present invention; the hydraulic turbine generator 28 corresponds to the "hydraulic power generation device" according to the ninth aspect of the present invention; and the atmospheric $CO_2$ recovery device 24 corresponds to the "liquid supply device" according to the ninth aspect of the present invention.

Eighth Embodiment

Figure 11:
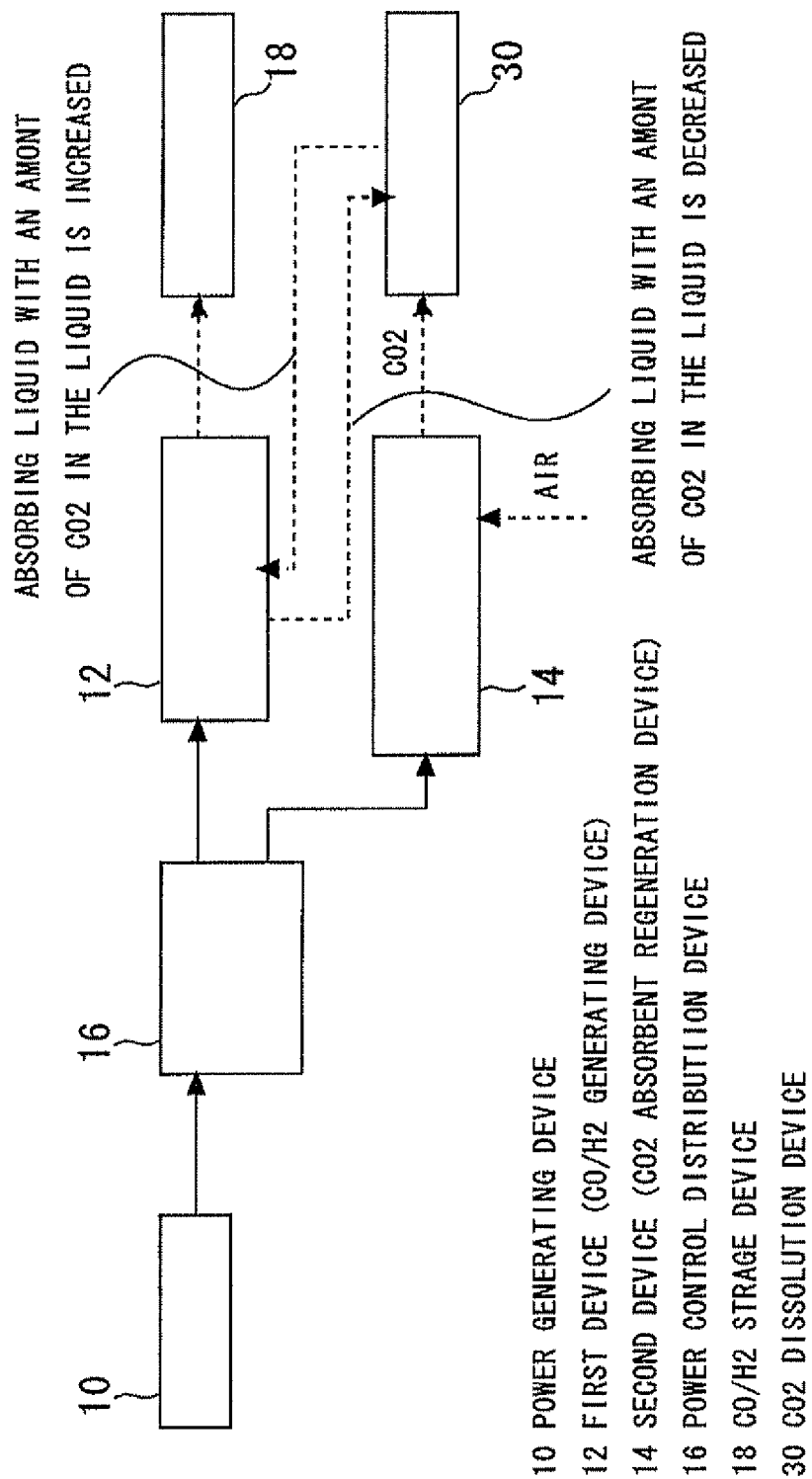
FIG. 11 is a block diagram illustrating a configuration of a system according to an eighth embodiment.

An eighth embodiment of the present invention will now be described with reference to FIG. 11. The eighth embodiment is characterized in that the blower/liquid supply device and atmospheric $CO_2$ recovery device according to the sixth embodiment are respectively replaced by a $CO_2$ absorbent regeneration device and a $CO_2$ dissolution device. Elements of the system except for the $CO_2$ absorbent regeneration device and $CO_2$ dissolution device, and the method of electrolytic solution supply control will not be redundantly described because they are the same as those described in connection with the sixth embodiment.

As described in connection with the sixth embodiment, the amount of $CO_2$ in the electrolytic solution decreases as CO is generated. To steadily generate CO, it is necessary to additionally introduce $CO_2$ into the electrolytic tank from the outside. Hence, as shown in FIG. 11, the present embodiment includes the $CO_2$ absorbent regeneration device as the second device 14. The second device 14 is combined with a $CO_2$ dissolution device 30 to perform a function of supplying the electrolytic solution to the first device 12. More specifically, the second device 14 includes a heater (not shown), a water addition device (not shown), and a $CO_2$ absorbent (not shown) having $CO_2$ absorption characteristics (e.g., sodium hydroxide or calcium hydroxide). When the $CO_2$ absorbent is heated by the heater, $CO_2$ is removed from the $CO_2$ absorbent. When the water addition device adds water to the $CO_2$ absorbent, its $CO_2$ absorption characteristics are regenerated. Therefore, when the removal of $CO_2$ and the regeneration of $CO_2$ absorption characteristics are repeated in the second device 14, $CO_2$ can be separated from atmospheric air and supplied to the $CO_2$ dissolution device 30. Further, the $CO_2$ dissolution device 30 contains the $CO_2$ absorbing liquid/electrolytic solution, and functions as a liquid supply pump so that $CO_2$ supplied from the second device 14 is dissolved in the $CO_2$ absorbing liquid/electrolytic solution and supplied to the first device 12.

[Power Distribution Control in the Eighth Embodiment]

When variable electric power is supplied to the second device 14, the thermal dose per unit time varies. However, the $CO_2$ absorbent has a heat capacity. Therefore, even when the thermal dose per unit time varies, the $CO_2$ absorbent can reach a regeneration temperature with time and generate $CO_2$. As such being the case, the present embodiment exercises power distribution control so as to supply a steady-state portion of electric power generated by the power generating device 10 to the first device 12 and supply the remaining variable portion to the second device 14. When the above-described power distribution control is exercised, the variable electric power can be effectively used to generate $CO_2$.

As described above, the system according to the present embodiment can additionally supply $CO_2$ to the first device 12. Therefore, the first device 12 can steadily generate CO. Further, when the power distribution control according to the present embodiment is exercised, the variable electric power can be effectively used to generate $CO_2$.

In the eighth embodiment, which has been described above, the second device 14 ($CO_2$ absorbent regeneration device) and the $CO_2$ dissolution device 30 correspond to the "carbon dioxide supply device" according to the sixth aspect of the present invention.

Further, in the eighth embodiment, which has been described above, the $CO_2$ dissolution device 30 corresponds to the "carbon dioxide recovery device" according to the seventh aspect of the present invention.

Furthermore, in the eighth embodiment, which has been described above, the second device 14 ($CO_2$ absorbent regeneration device) corresponds to the "carbon dioxide absorption/regeneration device" according to the tenth aspect of the present invention.

Ninth Embodiment

Figure 12:
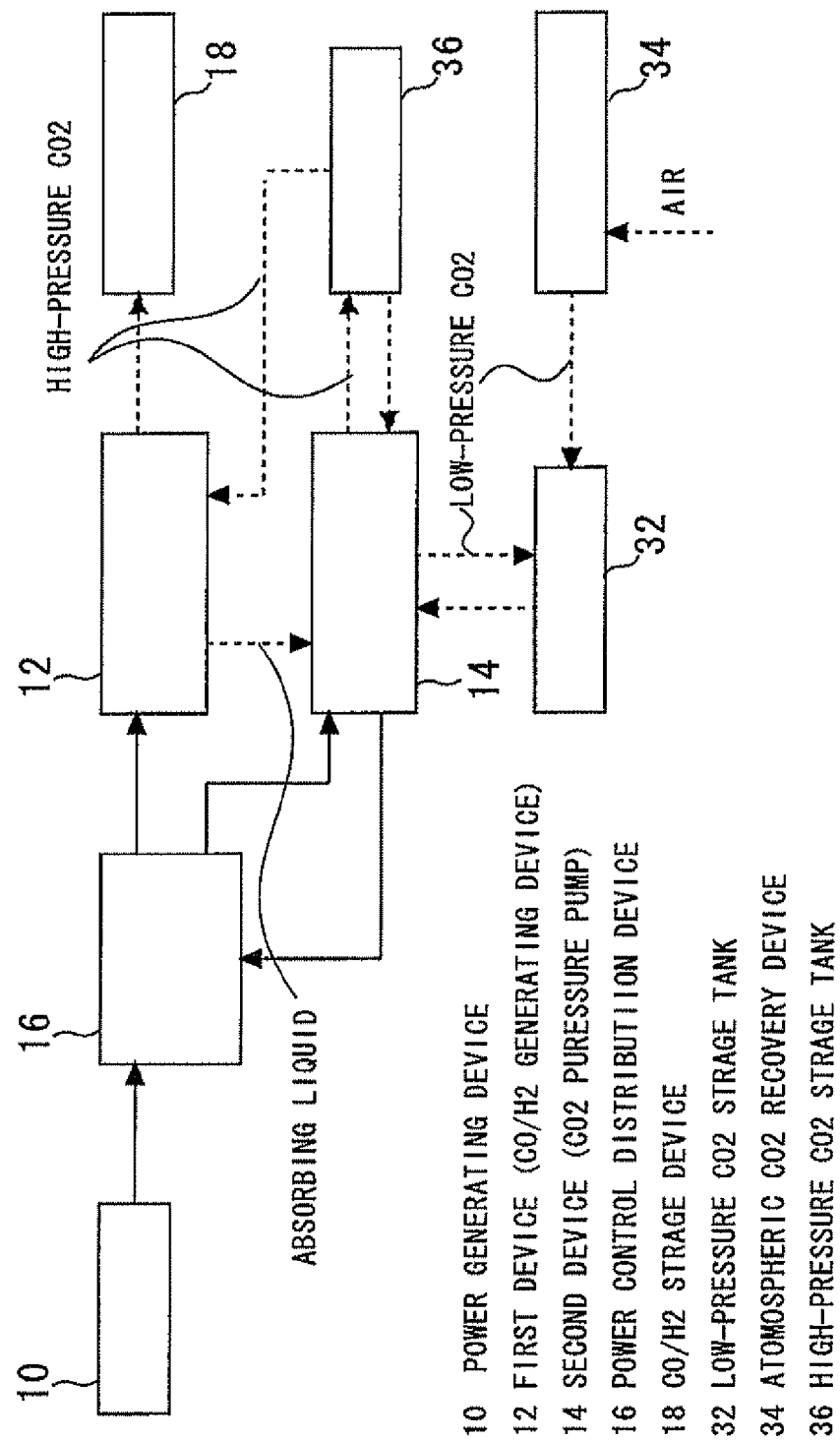
FIG. 12 is a block diagram illustrating a configuration of a system according to a ninth embodiment.

A ninth embodiment of the present invention will now be described with reference to FIG. 12. The ninth embodiment is characterized in that the blower/liquid supply device according to the sixth embodiment and the atmospheric $CO_2$ recovery device 24 are replaced by a later-described $CO_2$ pressure pump and a high-pressure $CO_2$ storage tank, respectively, and that power supply control is exercised as described later when the above-described power distribution control and electrolytic solution supply control are exercised. Elements of the system except for the $CO_2$ pressure pump and high-pressure $CO_2$ storage tank, and the methods of power distribution control and electrolytic solution supply control will not be redundantly described because they are the same as those described in connection with the sixth embodiment.

As described in connection with the sixth embodiment, the amount of $CO_2$ in the electrolytic solution decreases as CO is generated. To steadily generate CO, it is necessary to additionally introduce $CO_2$ into the electrolytic tank from the outside. Hence, as shown in FIG. 12, the present embodiment includes the $CO_2$ pressure pump as the second device 14. The second device 14 is combined with a low-pressure $CO_2$ storage tank 32, an atmospheric $CO_2$ recovery device 34, and a high-pressure $CO_2$ storage tank 36 to perform a function of supplying the $CO_2$ absorbing liquid/electrolytic solution to the first device 12. The high-pressure $CO_2$ storage tank 36 contains the $CO_2$ absorbing liquid/electrolytic solution. The $CO_2$ absorbing liquid/electrolytic solution absorbs $CO_2$ when pressurized by the second device 14, and is supplied to the first device 12 by a liquid supply pump (not shown). Further, the $CO_2$ recovered by the atmospheric $CO_2$ recovery device 34 and temporarily stored in the low-pressure $CO_2$ storage tank 32 is pressurized by the second device 14.

[Power Supply Control in the Ninth Embodiment]

When variable electric power is supplied to the second device 14, the drive of the $CO_2$ pressure pump varies. Therefore, when electric power increases, the present embodiment causes the $CO_2$ pressure pump to function as a blower pump and permits the high-pressure $CO_2$ storage tank 36 to absorb $CO_2$. Further, when electric power decreases, the present embodiment exercises power supply control so as to supply electric power to the power control distribution device 16 by using part of the pressure from the high-pressure $CO_2$ storage tank 36 to drive the $CO_2$ pressure pump in a reverse direction and operate it as a power generator. This power supply control is exercised in accordance with a control signal from a controller (not shown). Exercising power supply control as described above makes it possible to compensate for changes in natural energy power generation. Therefore, stable electric power can be supplied to the first device 12. Consequently, the present embodiment provides substantially the same advantages as the third embodiment.

As described above, the system according to the present embodiment can additionally supply $CO_2$ to the first device 12. Therefore, the first device 12 can steadily generate CO. Further, the present embodiment exercises power supply control in such a manner as to compensate for changes in natural energy power generation. Thus, stable electric power can be supplied to the first device 12. Consequently, the mixture ratio between CO and $H_2$ in the CO/$H_2$ storage device 18 can be adjusted to increase the ratio of CO with an increased degree of freedom. As a result, the first device 12 can be operated with ease.

In the ninth embodiment, which has been described above, the second device 14 ($CO_2$ pressure pump), the low-pressure $CO_2$ storage tank 32, the atmospheric $CO_2$ recovery device 34, and the high-pressure $CO_2$ storage tank 36 correspond to the "carbon dioxide supply device" according to the sixth aspect of the present invention.

Further, in the ninth embodiment, which has been described above, the high-pressure $CO_2$ storage tank 36 corresponds to the "carbon dioxide recovery device" according to the seventh aspect of the present invention.

Furthermore, in the ninth embodiment, which has been described above, the second device 14 ($CO_2$ pressure pump) corresponds to the "rotating electrical machine" according to the eleventh aspect of the present invention; and the high-pressure $CO_2$ storage tank 36 corresponds to the "carbon dioxide recovery device" according to the eleventh aspect of the present invention.

Description Of Reference Numerals 10 power generating device
    12 first device
    14 second device
    16 power control distribution device
    18 CO/$H_2$ storage device
    20 $H_2$ storage device
    22 $H_2$ power generating device
    24, 34 atmospheric $CO_2$ recovery device
    26 absorbing liquid storage tank
    28 hydraulic turbine generator
    30 $CO_2$ dissolution device
    32 low-pressure $CO_2$ storage tank
    36 high-pressure $CO_2$ storage tank

The invention claimed is:

1. A fuel production system comprising:
 a power generating device that generates variable electric power;
 a power distribution device that is connected to the power generating device to distribute electric power to a plurality of electrical loads;
 a mixed gas generating device that is one of the electrical loads and performs electrolysis on water and carbon dioxide upon receipt of electric power distributed by the power distribution device to generate a mixed gas made of hydrogen and carbon monoxide; and
 a control device that controls the power distribution device so as to supply predetermined electric power to the mixed gas generating device, wherein the predetermined electric power is lower than the minimum power generated by the power generating device within a preselected period of time.

2. The fuel production system according to claim 1, further comprising:
 a mixed gas storage device that is connected to the mixed gas generating device to store the mixed gas; and
 a feedback control device that provides feedback control of the predetermined electric power to ensure that the substance quantity ratio between hydrogen and carbon monoxide in the mixed gas storage device coincides with a preselected ratio.

3. The fuel production system according to claim 1, further comprising:
 a hydrogen generating device that is one of the electrical loads and generates hydrogen upon receipt of electric power distributed by the power distribution device; and
 a hydrogen power generating device that generates electric power by using hydrogen generated by the hydrogen generating device.

4. The fuel production system according to claim 3,
 wherein, if the electric power generated by the power generating device is lower than the predetermined electric power while the control device controls the power distribution device to supply the predetermined electric power to the mixed gas generating device, the hydrogen power generating device supplies the generated electric power to the power distribution device.

5. The fuel production system according to claim 1, further comprising:

a charge/discharge device that is one of the electrical loads and capable of charging and discharging electric power distributed by the power distribution device; and a mixed gas generating device that generates a mixed gas made of hydrogen and carbon monoxide by performing electrolysis on water and carbon dioxide by using electric power from the charge/discharge device.

6. The fuel production system according to claim 1, further comprising:

a carbon dioxide supply device that is one of the electrical loads, recovers carbon dioxide from atmospheric air upon receipt of electric power distributed by the power distribution device, and supplies the recovered carbon dioxide to the mixed gas generating device.

7. The fuel production system according to claim 6, wherein the carbon dioxide supply device includes a carbon dioxide recovery device that contains an electrolytic solution having carbon dioxide absorption characteristics.

8. The fuel production system according to claim 7, wherein the carbon dioxide supply device includes an atmospheric air introduction device that introduces atmospheric air into the carbon dioxide recovery device, and a liquid supply device that supplies the electrolytic solution in the carbon dioxide recovery device to the mixed gas generating device.

9. The fuel production system according to claim 7, further comprising:

an electrolytic solution storage device that is disposed downstream and upward of the carbon dioxide recovery device to temporarily store an electrolytic solution discharged from the mixed gas generating device;

a hydraulic power generation device that includes a turbine rotated by an electrolytic solution dropped from the electrolytic solution storage device, causes the rotated turbine to generate electric power, and if the electric power generated by the power generating device is lower than the predetermined electric power, supplies the generated electric power to the power distribution device; and a liquid supply device that supplies the electrolytic solution dropped from the electrolytic solution storage device to the mixed gas generating device.

10. The fuel production system according to claim 7, wherein the carbon dioxide supply device includes a carbon dioxide absorption/regeneration device that is positioned upstream of the carbon dioxide recovery device, and contains an absorbent that has carbon dioxide absorption characteristics, discharges absorbed carbon dioxide when heated, and regenerates the carbon dioxide absorption characteristics when watered.

11. The fuel production system according to claim 7, wherein the carbon dioxide supply device includes a rotating electrical machine disposed upstream of the carbon dioxide recovery device; and wherein the rotating electrical machine includes a turbine, functions as a pressure pump that lets the turbine rotate to compress carbon dioxide and introduce the compressed carbon dioxide into the carbon dioxide recovery device, and if the electric power generated by the power generating device is lower than the predetermined electric power, functions as a power generator that generates electric power by allowing the compressed carbon dioxide in the carbon dioxide recovery device to rotate the turbine in a reverse direction and supplies the generated electric power to the power distribution device.

12. The fuel production system according to claim 1, wherein the power generating device includes at least one of a solar photovoltaic power generation device, a solar thermal power generation device, a wind power generation device, a tidal power generation device, and a geothermal power generation device.

* * * * *